Oct. 5, 1948.    A. KOPPEL    2,450,517
MOTION PICTURE FILM REEL
Filed Jan. 10, 1946    2 Sheets-Sheet 1
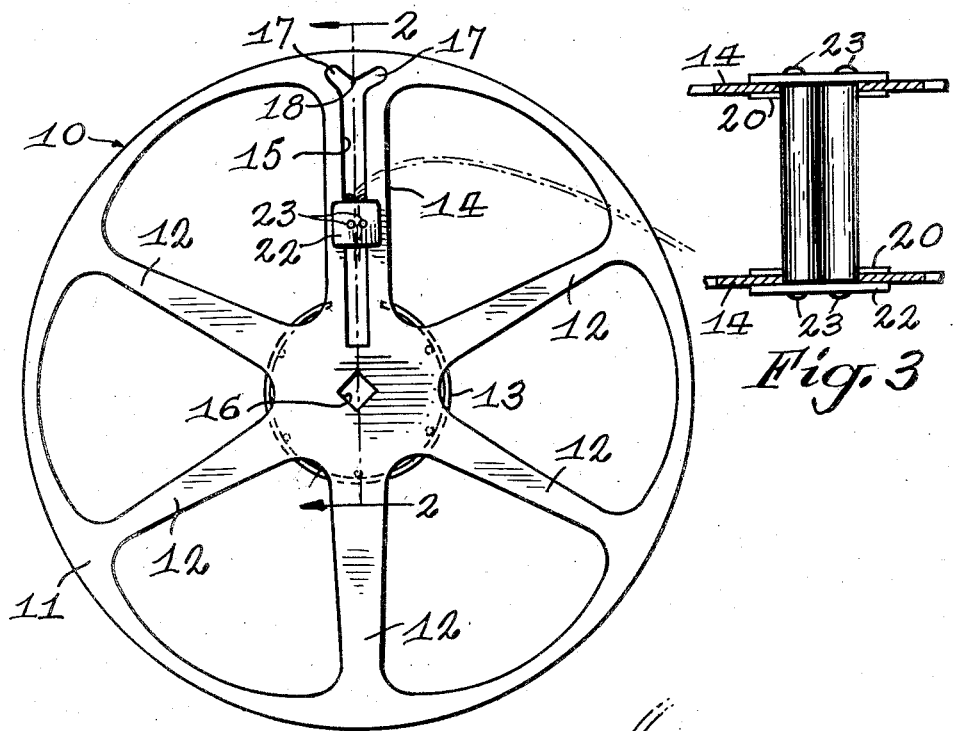
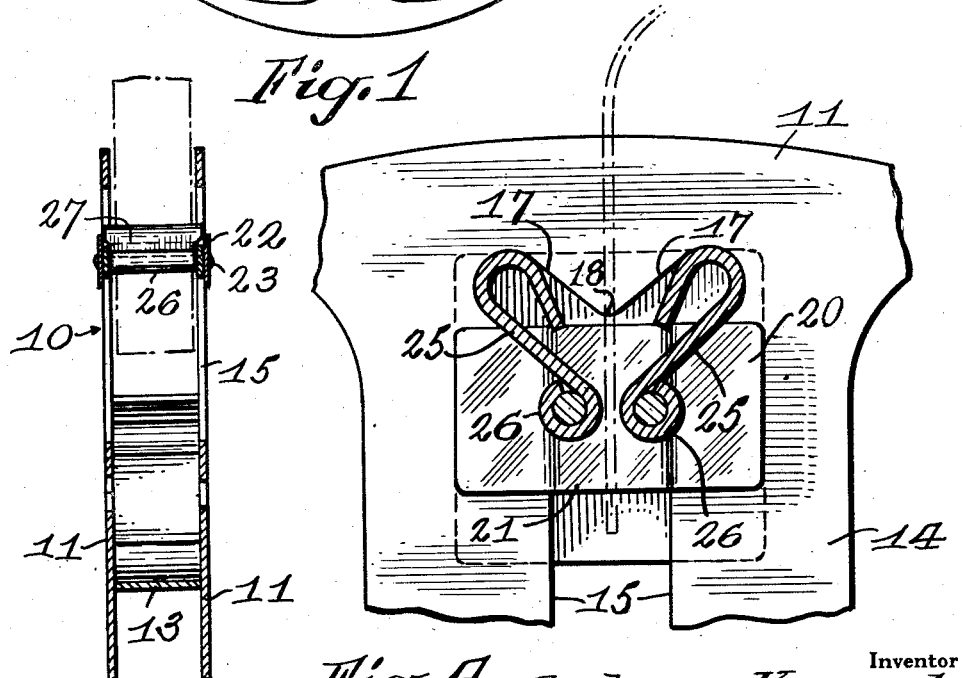
Fig. 1
Fig. 2
Fig. 3
Fig. 4
Inventor
Aubrey Koppel
By
Attorneys Oct. 5, 1948.  A. KOPPEL  2,450,517
MOTION PICTURE FILM REEL
Filed Jan. 10, 1946  2 Sheets-Sheet 2

Inventor
Aubrey Koppel
By
Attorneys

Patented Oct. 5, 1948

2,450,517

UNITED STATES PATENT OFFICE 2,450,517

MOTION-PICTURE FILM REEL

Aubrey Koppel, Montreal, Quebec, Canada

Application January 10, 1946, Serial No. 640,262

7 Claims. (Cl. 242—70)

This invention relates to film reels and more particularly to a reel having improved means for securing and threading therein, the free end of the film.

In film reels and the like, the film is usually secured to the reel by inserting the free end of the film in a slot provided in the core, particularly in inexpensive types of reels. Normally this is an awkward, relatively difficult procedure, due to the depth at which the core is disposed with respect to the narrow space existing between the flanges, and this becomes increasingly difficult in large reels of sub-standard sizes of films.

The present invention is conceived to obviate this difficulty by providing means whereby the film can be positively and simply secured to the reel in a convenient manner, regardless of the size of the reel and the width of the space between the flanges. The invention has for one of its objects, the provision of means set forth above which are inexpensive to manufacture and assemble, and which therefore will not greatly increase the cost of the reel.

In brief, the invention consists of a conventional reel with a film clamping device which is slidable radially on the reel, and which assumes an open or film receiving position, when it is moved to the outer limit of its ambit, near the periphery of the flanges, and is closed upon the film when it is moved to the inner limit of its ambit, at the core.

In describing the invention, reference will be made to the attached drawings in which:

Figure 1 is a side elevation view of the improved reel.

Figure 2 is a fragmentary sectional view taken on the line 2—2 of Figure 1.

Figure 3 is a transverse fragmentary view of the reel, showing the clamping means in detail.

Figure 4 is a vertical cross sectional view of the film clamping means in its outer position.

Figure 5:
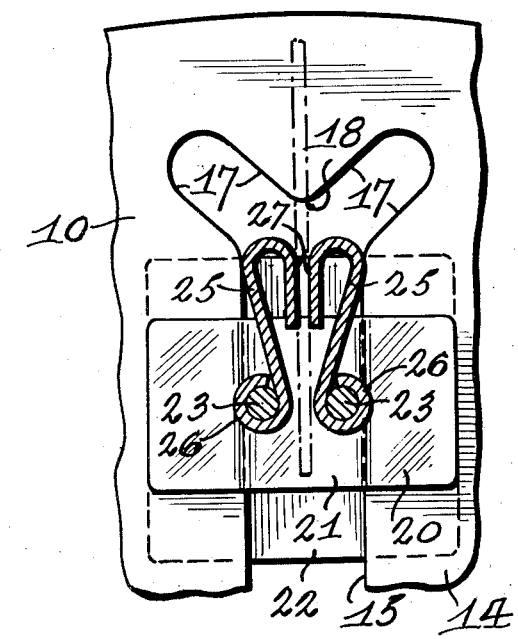
Figure 5 is a similar view of the film clamping means in an intermediate position.
Figure 7:
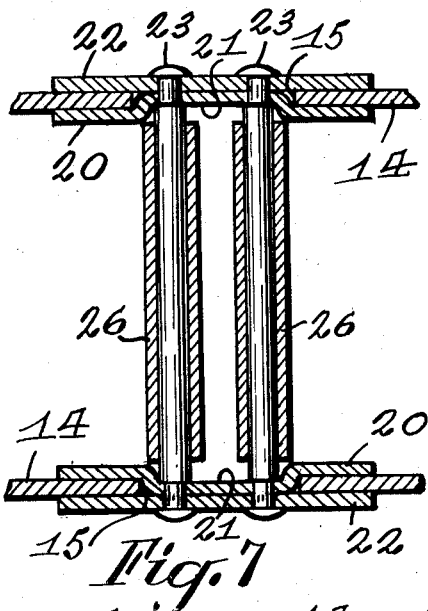
Figure 7 is an enlarged transverse fragmentary view of the reel sectionally, illustrating said means in film releasing position.

Referring more in detail to the drawings, it will be seen that the reel generally indicated at 10, consists of the usual flanges 11, having spokes 12, and secured to a core 13. The reel construction and assembly is of secondary importance, and may be constructed along any well known lines common to the art. It will be noted however, that one spoke 14, of each flange, is enlarged compared with the remaining spokes, and is provided with a longitudinal central slot 15, which extends from a position close to the central aperture 16, to a position close to the peripheral edge of the flange, the slots extend radially with respect to the reel as a whole.

The peripheral extremity of the slot is bifurcated to assume the appearance illustrated in Figure 1, the said bifurcation consisting of angularly diverging, narrow slots 17. The slots are arranged in aligned, coacting position on the assembled reel.

The film securing means are slidably disposed in the coacting slots 15, and consists of a slider having a pair of plates 20, with a central offset portion 21, so dimensioned that it can freely and snugly enter the slot 15, without appreciable lateral movement therein. The plates 20, are disposed on the inside of the flanges and secured to the body plates 22, which are positioned on the outside of the flanges adjacent the spokes 14, by means of long rivets 23. The said rivets are of such length as to extend from one flange to the other, and are provided at their ends with shoulders which retain both the offset portion 21 and the body plate 22 between the said shoulders and the rivet heads in loose abutment, consequently the ends of the plates 20 and 22 form therebetween a stay through which the margin of the slots 15 are disposed, the entire assembly therefore forming a slide enabled to move along the slots 15, from one extremity thereof to the other.

A film clamping element 25, is freely disposed on each rivet 23. The clamping element is substantially S shaped in cross section, as shown in Figures 4, 5, and 6, and is rounded at one end as at 26, to act as a bearer for pivoting said member on the rivet 23, the outer end being folded back on itself to provide a lip 27, which faces the lip 27 of its opposite member.

The clamping elements are of a length substantially equal to the distance between the plates 20, with the exception of the crests of the lip which sections are extended outward, so as to engage the edges of the slots 15, and 17, and be guided thereby.

From the foregoing description, it will be evident that when the slider is directed to the periphery of the flanges, the lips 27 will be moved into a diverging position in their respective slots 17, by the action of the lobes 18, acting upon the extended section at the crest of the lips. In this position the film may be easily removed from between the opened lips or inserted therebetween as the case may be, as shown in Figure 4.

Figure 6:
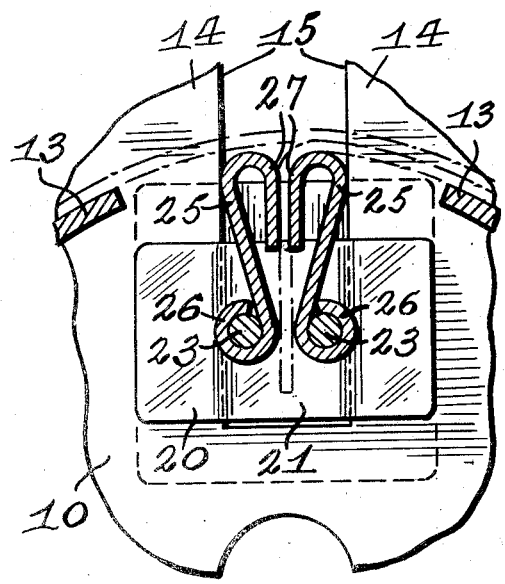
Figure 6 is a similar view of the film clamping means in its inner position.
Figure 8:
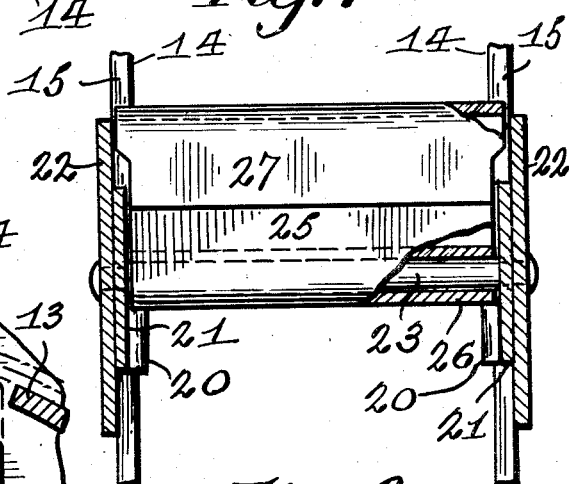
Figure 8 is a similar view of the reel illustrating one film clamping element in detail and at right angles to Figure 3.

When the said film is inserted between the lips, the slider is moved through the slot 15 toward the core, causing the lips to come together as shown in Figure 5. In practice, the said lips are so shaped and resilient in nature, that when in their closed position, the film is tightly clamped between the opposed faces of the lips and securely held in place. Thereafter the slider is moved to its innermost position in the slot 15, having passed through a transverse opening or slot in the surface of the core. In this position the film registers with the core surface and can be easily wound thereon.

From the foregoing disclosure, it will be apparent that means have been provided whereby an operator is enabled to slide the film securing means, to the periphery of the flanges, where it automatically assumes an open position for the easy insertion of the film therein, in the simplest possible manner, whereupon it is moved inward toward the core, automatically closing upon and clamping the film until finally the film is located in position to be wound upon the core.

What I claim is:

1. A film reel comprising side flanges and a core, a radially disposed slot in each flange having a bifurcated outer extremity, a stay in marginal engagement with each slot, cross members joining the stays, the whole slidable in the slots and film clamping means pivotally attached to the cross members and means to open and close the film clamping means.

2. A film reel comprising side flanges and a core, a radially disposed slot in each flange having a bifurcated outer extremity, a stay in marginal engagement with each slot, cross members joining the stays, the whole slidable in the slots, an S-shaped clamping element pivoted at one extremity on each cross member the opposite extremity forming a lip which coacts with the lip of the complementary clamping element to secure a film therebetween.

3. A film reel as claimed in claim 2, characterized in that the clamping elements are provided with lateral projections which engage with the margin of the slots.

4. A film reel comprising side flanges and a core, a radially disposed slot in each flange having a bifurcated outer extremity near the periphery of the flange, an opening in the core above the inner extremity of the slot, a plate overlapping the margin of the slots on the outside of the flanges, a plate overlapping the margin of the slots on the inside of the flanges, an offset central section in the last named plates adapted to be within the slots, cross members adapted to secure the plates together in sliding arrangement, in the slots and film clamping means pivoted on the cross members.

5. A film reel comprising side flanges and a core, a radially disposed slot in each flange having a bifurcated outer extremity near the periphery of the flange, an opening in the core above the inner extremity of the slots, a plate overlapping the margin of the slots on the outside of the flanges, a plate overlapping the margin of the slots on the inside of the flanges, an offset central section in the last named plates adapted to be within the slots, cross members adapted to secure the plates together in sliding arrangement, in the slots and a film clamping element pivoted at one extremity on each cross member, the opposite extremity bent back on itself to form a lip which coacts with the lip of the complementary clamping element and lateral projections on the clamping elements which extend into the slots in engagement with the margins thereof.

6. A film reel comprising a core, side flanges each having a radially-disposed slot, each of said slots having a bifurcated end near the periphery of said flanges, a slider engageable in said slots having two transverse members, film-clamping means pivotally secured to said members adapted to marginally engage said slots and be opened by said bifurcated ends.

7. A film reel comprising, in combination, a core, side flanges having an aligned pair of radial slots, each slot having a bifurcated extremity near the periphery of the flange, a stay engageable in each slot, cross-members connecting said stays, and film-clamping means secured to said cross-members in marginal engagement with said slots; whereby the stays cross-members and clamping means are radially slideable as a unit in said slots, and said means are adapted to be opened by said bifurcated slot extremities.

AUBREY KOPPEL.

REFERENCES CITED

The following references are of record in the file of this patent:

UNITED STATES PATENTS

| Number | Name | Date |
| --- | --- | --- |
| 2,107,530 | Goldberg | Feb. 8, 1938 |

FOREIGN PATENTS

| Number | Country | Date |
| --- | --- | --- |
| 663,947 | Germany | Aug. 17, 1938 |